Jan. 11, 1944.　　　　C. H. WHITE　　　　2,338,698
DISK HARROW
Filed July 12, 1940　　　　2 Sheets-Sheet 1

INVENTOR:
CHARLES H. WHITE
BY
ATTORNEYS.

Jan. 11, 1944.   C. H. WHITE   2,338,698
DISK HARROW
Filed July 12, 1940   2 Sheets-Sheet 2
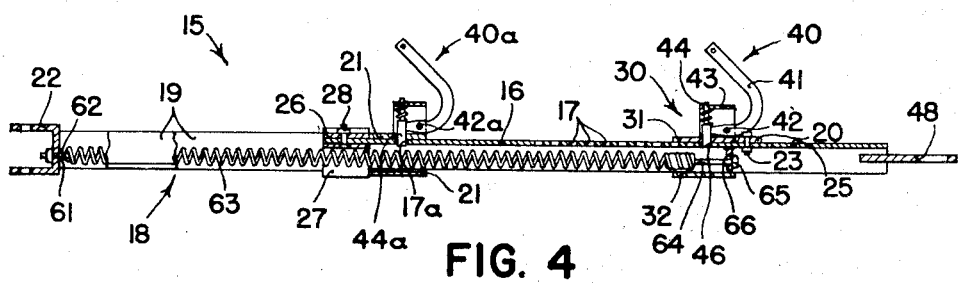
FIG. 4
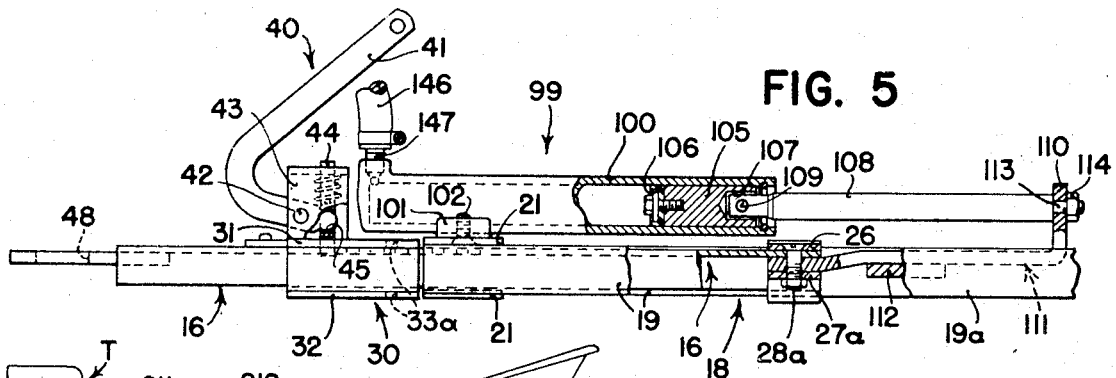
FIG. 5
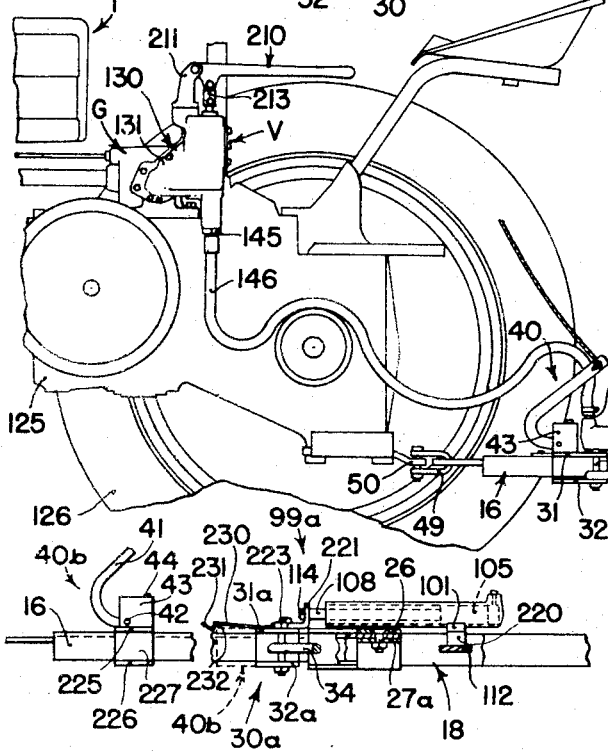
FIG. 6
FIG. 8
INVENTOR:
CHARLES H. WHITE
BY
ATTORNEYS.

Patented Jan. 11, 1944

2,338,698

UNITED STATES PATENT OFFICE 2,338,698

DISK HARROW

Charles H. White, Moline, Ill., assignor to Deere & Company, Moline, Ill., a corporation of Illinois Application July 12, 1940, Serial No. 345,020

50 Claims. (Cl. 55—81)

This invention relates to agricultural implements and more particularly to implements such as disk harrows and the like that are adapted to be drawn by a tractor.

The object and general nature of this invention is the provision of improved means, utilizing stored energy or deriving energy from the tractor, for actuating the draft connections between the disk harrow and the tractor so that the harrow may be angled or straightened during the forward travel of the machine at its normal rate. Another feature of this invention is the provision of means energized to shift the hitch into a position such that the gangs can be swung into an angled position after having been shifted into a straightened position by the draft force, this being accomplished without backing the tractor and, as a matter of fact, without interrupting the forward travel of the outfit at its normal pace.

Another feature of the present invention is the provision of means for determining the angled or operating position of the gangs, the setting of which is not disturbed by movement of the gangs into their straightened or non-operating position. Still further, it is a feature of this invention to provide a disk harrow controlled by means deriving power from the tractor, which is so arranged that the gangs may be shifted into their non-working position without losing the setting of the angled or working position.

It is a further feature of this invention to provide hydraulic mechanism, deriving power from the tractor, for controlling the retractable drawbar and the gangs.

An additional object of the present invention is the provision of a disk harrow having a sliding drawbar arrangement which is utilized for angling and straightening the gangs, and in which is incorporated a spring or the like which is biased when the gangs are swung into their angled position and is capable of being controlled so that the energy stored in the spring can be utilized to shift the entire harrow when in its transport position forwardly relative to the slidable drawbar without discontinuing the normal forward movement of the outfit. More particularly, it is a feature of this invention to provide such spring means so constructed and arranged that when tensioned it is capable of exerting sufficient force to impart momentum to the harrow to cause the same to be carried forwardly, relative to the tractor, into a position where the forward draft may be utilized to angle the gangs, yet in such position, to which the harrow is carried by its own momentum, where the spring means is more or less slack, whereby upon proper manipulation of the controls, the movement of the gangs toward their angled position is sufficient to overcome the initial force of such spring, whereupon the completion of the movement of the gangs into their angled position places the proper amount of tension in the spring.

These and other objects and advantages of the present invention will be apparent to those skilled in the art after a consideration of the following detailed description taken in conjunction with the accompanying drawings.

In the drawings:

Figure 4 is a longitudinal sectional view, taken at an enlarged scale generally along the line 4—4 of Figure 1;

Figure 5 is a fragmentary view of a modified form of the present invention wherein hydraulic means is utilized for cocking the harrow drawbar and straightening the gangs, said hydraulic means deriving power from the tractor;

Figure 6 is a fragmentary side view of the tractor and harrow provided with the hydraulic unit shown in Figure 5.

Figure 1:
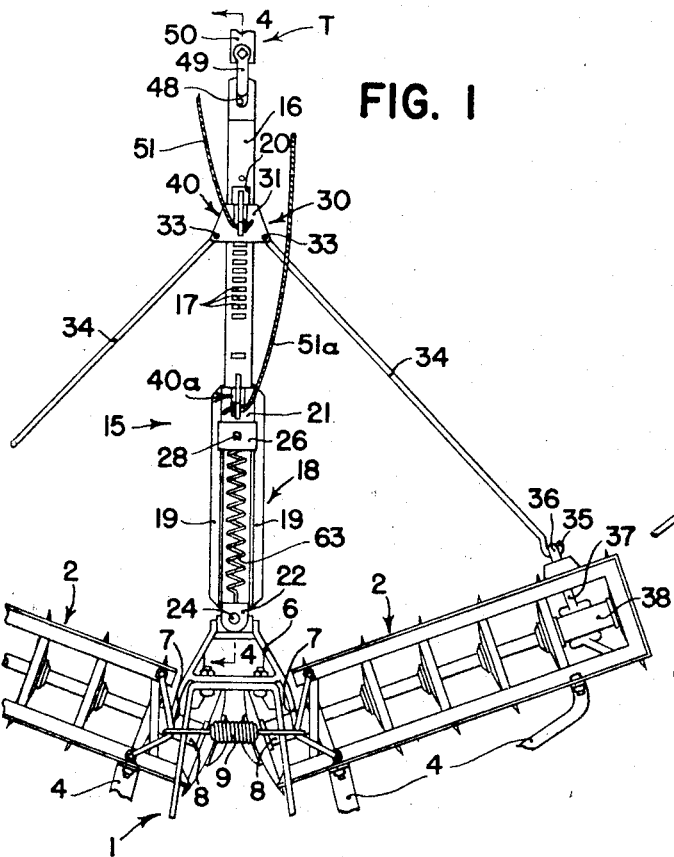
Figure 1 is a fragmentary plan view of a disk harrow in which the principles of the present invention have been incorporated, the harrow being shown in angled working position.

Referring now to Figures 1 to 4, involving the feature of storing a part of the power as developed by the tractor or other propelling means, it will be seen that the disk harrow, shown fragmentarily in the accompanying drawings, includes a frame 1, a pair of front gangs 2 pivotally connected to the frame 1, and a pair of rear gangs (not shown) also pivoted at their inner ends to the frame 1 and operatively connected through linkage 4 with the front gangs, this being the construction disclosed generally in my prior United States Patent No. 2,264,783, issued December 2, 1941. The frame 1 includes a forward extension 6, arms 7 of which turn downwardly to serve as the pivots for the inner bearings 8 of the front gangs. The harrow also includes suitable means, such as springs 9, for holding the front and rear gangs against upthrust, due to the fact that the center of soil resistance against the disks lies below the bearings to which the gang frames are connected.

Figure 2:
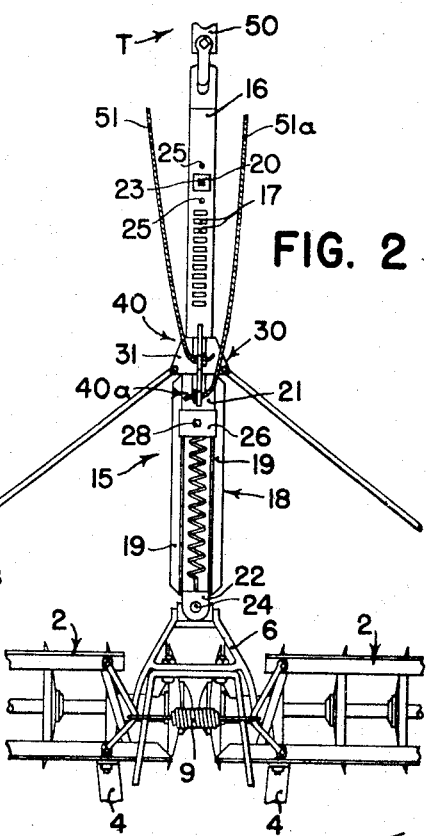
Figure 2 is a view similar to Figure 1 but showing the position of the parts after the front latch has been released to permit the gangs to swing back into their straightened or transport position.
Figure 3:
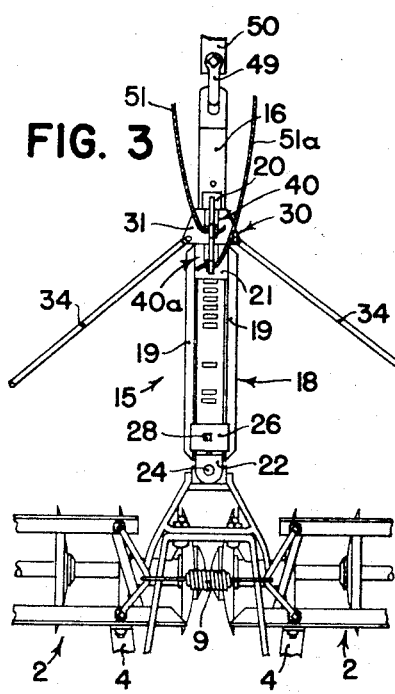
Figure 3 is a view similar to Figure 2, showing the position of the parts after the rear latch has been released to permit the power stored in the spring to retract, or cock, the slidable drawbar member relative to the companion drawbar member.

The drawbar unit of the harrow is indicated in its entirety by the reference numeral 15 and comprises a slidable drawbar proper, preferably in the form of a channel 16 having its flanges extending downwardly and with its web provided with a number of slots 17, and a companion drawbar member or frame means 18, preferably in the form of a pair of angles 19 connected together in spaced apart relation by a pair of upper and lower plates 21 welded or otherwise secured to the forward ends of the angles 19 and a rear U-shaped bracket 22 welded to the rear ends of the angles 19 and apertured to receive a hitch or pivot pin 24 by which the rear end of the drawbar 15 is pivoted to the front end of the harrow frame 1, both for lateral and vertical swinging movement, as disclosed in my prior patent mentioned above. The drawbar channel 16 is slidable or shiftable between the upper and lower plates 21 and between the laterally spaced apart angles, as clearly shown in Figures 1, 2 and 3, and is connected through draft links to be described later with the disk gangs to shift or swing them between straightened and angled or working positions. A pair of upper and lower guide plates, indicated at 26 and 27, are secured by a bolt 28 to the rear end of the drawbar channel 16 and serve as stops limiting the outward movement of the channel 16 by virtue of their engagement with the rear edges of the front plates 21. The rearward movement of the channel 16 relative to the rear drawbar member 18 is limited by the engagement of the plates 26 and 27 with the U-shaped member 22, as best shown in Figure 3. At its forward end the channel 16 carries an adjustable angle-limiting plate 20 which is secured by a bolt 23 in any one of several openings 25, as best shown in Figure 2.

A front slide, indicated in its entirety by the reference numeral 30, embraces the drawbar channel 16 and preferably comprises a pair of plates 31 and 32 (Figure 4) connected together by suitable means in spaced apart relation so as to be freely movable along the drawbar channel 16 and arranged to support a pair of pivots 33 to which the front ends of a pair of draft links 34 are connected. The rear ends of the links 34 have hook portions 35 which engage with the forward looped parts 36 of the forward front gang bearing standards 37, which are connected with the outer bearings 38 of the front gangs. The front slide 30 carries latch mechanism 40 which includes a latch lever 41 pivotally mounted, as at 42, on a bracket 43 in which a vertically reciprocable latch dog 44 is movable. The latch dog 44 is provided with a slot 45 (Fig. 5) in which one end of the lever 41 is received, and the lower end of the latch dog 44 is arranged to enter any one of a plurality of the slots 17 for the purpose of latching the slide 30 against movement relative to the drawbar 16. The lower end of the dog 44 is beveled off, as at 46, so that the drawbar channel 16 may move rearwardly, relative to the slide 30, but the latter is prevented from moving rearwardly relative to the channel 16 unless the latch 40 is released, as by swinging the lever 41 forwardly. A similar latch 40a is carried on the plate 21 at the front end of the drawbar member 18 and is constructed like the latch 40 except that the lower end of the dog 44a is not beveled. Hence the latch 40a does not ratchet, and when engaged with the channel 16 can hold the latter against movement in either direction.

By virtue of the drawbar construction so far described, it will be seen, particularly from Figure 1, that when the slide 30 is latched to the drawbar channel 16, normally the draft pull extends the channel 16 relative to the drawbar member 18, the plates 26 and 27 limiting the forward movement of the channel 16 relative to the member 18. Since the slide 30 is latched to the channel 16, this forward movement of the latter exerts a pull through the draft links 34 and swings the front gangs into their angled position, the rear gangs (not shown) swinging rearwardly into their angled position by virtue of the interconnecting linkage 4. The forward end of the drawbar channel 16 is slotted, as at 48, to receive a clevis 49, by which the harrow may be hitched to a tractor T, represented by the tractor drawbar 50. A cable 51 extends from the latch lever 41 and enables the operator to engage or release the latch while sitting or standing on the tractor.

With the parts in operation and in the relative positions shown in Figure 1, when the operator exerts a pull on the cable 51 and releases the latch mechanism 40, the draft or soil resistance which the disks encounter causes the gangs to swing back into their straightened position, the slide 30 moving backwardly along the drawbar channel 16 (Figure 2) until the plates 31 and 32 (Figure 4) engage the front edges of the upper and lower plates 21 at the front ends of the angles 19. This defines the straightened or transport position of the harrow.

As mentioned above, it is a feature of the present invention to provide power means, deriving its operating energy from the tractor or other propelling means, whereby the gangs may be angled or straightened at will, without requiring that the tractor be backed or otherwise moved in any direction except in the normal forward direction. One form of such means will now be described.

The U-shaped yoke 22 at the rear end of the drawbar is apertured, as at 61, to receive a bolt 62 or other connecting member by which the rear end of a spring 63 is connected to the part 22, and hence to the frame 1 of the disk harrow. The spring 63 extends forwardly between the two drawbar angles 19 and also forwardly within the sliding drawbar channel 16, as best shown in Figure 4. The front end of the spring is secured in any suitable manner to a nut member 64 which is provided with a screw-threaded bore to receive the threaded end of an adjusting bolt 65, the forward end of the latter being anchored to a lug 66 or other suitable means formed on or carried by the drawbar channel 16 adjacent its forward end. The adjusting member 65 is of sufficient length to provide for adjusting the tension of the spring 63 to meet various operating conditions.

The operation of the form of the invention described above is substantially as follows:

Figure 3 represents the drawbar and the associated portions of the harrow in transport position and with the drawbar slide channel 16 in its "cocked" or retracted position, relative to the rear drawbar member 18. With the rear latch 40a engaged, the sliding drawbar 16 is held against forward movement relative to the rear drawbar section 18, and the engagement of the plates 31 and 32 of the front slide 30 against the forward edges of the plates 21 at the front end of the drawbar member 18 prevents the disk gangs from swinging rearwardly out of their straightened or transport position. With the parts arranged in this manner, the tractor 50 may be driven to any point desired and the disk gangs will roll in their straightened position, as is customary when transporting a disk harrow. When it is desired to angle the gangs, that is, to swing them into their angled or working position, the rear latch 40a is released, whereupon the forward draft pull extends the slidable drawbar 16 forwardly until the plates 26 and 27 engage the rear edges of the plates 21, it being understood that the latch 40 is not released but is left engaged.

This extension of the member 16 relative to the drawbar member 18 does two things: first, since the slide 30 is left latched to the slidable drawbar section 16, the forward draft pulls the outer ends of the front gangs into their angled position, as shown in Figure 1, or in other words, the resistance of the soil acting against the inner ends of the front gangs swings them rearwardly into the angled position (Figure 1) while the forward draft pulls the outer ends in the direction of travel during the continued movement of the tractor. Figure 1 shows the gangs in their maximum angled position, but if it is desired to operate with the gangs at a smaller angle, the latch 40 is momentarily released to permit the slide 30 to drop back a few notches, and then the latch 40 is reengaged in one of the notches 17 of the slidable drawbar 16.

The second result of extending the drawbar section 16 forwardly is to place the spring 63 in a biased or tensioned condition. The spring 63 is so arranged that in its unstressed condition, that is, when the slidable drawbar section 16 is in its rearward position, the spring 63 is practically unstressed, and hence there is no substantial resistance initially to the extension of the drawbar 16. This permits the disk gangs to swing backwardly, whereupon the disks, being in an angled position although not at a great angle, bite into the soil, so that the resistance to their forward travel is materially increased. This additional resistance then becomes available as the tractor continues to move forwardly to stretch the spring 63, and as will be obvious, the greater the angle of the disk gangs the greater will be the draft forces available to stretch the spring, and hence store energy therein. When the parts reach the position shown in Figure 1, with the drawbar slide 16 in its maximum extended position, the latch 40a is permitted to reengage the slidable drawbar section 16, the dog 44 of the latch 40a moving into a rear notch, indicated at 17a in Figure 4. Thus, when the latch 40a engages the slidable drawbar section 16 when the latter is extended, the spring 63 is latched in its biased or stressed position.

When the farmer reaches the end of the field or otherwise desires to straighten the gangs when the harrow parts are in the relative positions shown in Figure 1, all he has to do is to pull on the cable 51 of the front latch 40. This will swing the latch lever 41 of the front latch and disengage the dog from the notch 17 in which it has been engaged. Then, as the tractor continues to move forwardly, the slide 30 moves rearwardly along the rear end of the drawbar section 16 back to the position shown in Figure 2, in which the gangs are in their aligned or straightened position, the slide plates 31 and 32 being back against the forward edges of the drawbar plates 21 at the front end of the drawbar section 16. Thus, the disk harrow gangs are in the same position they occupied in the previously described transport position of the harrow (Figure 3), except that now the drawbar section 16 is extended (Figures 2 and 4) instead of being retracted (Figure 3). The farmer may then move the harrow to another point by merely continuing the forward travel of the tractor, and then when the farmer reaches the place where he again desires to place the harrow in operating position, all he has to do is to pull the rear cable 51a to disengage the rear latch 40a, pulling the dog 44 of the rear latch out of the notch 17a, whereupon the force stored in the stressed spring 63 is immediately made available to roll the harrow forwardly, causing the same to advance relative to the tractor and the drawbar section 16. The spring is constructed and arranged so that when in its stressed position it is capable, when released, to roll the harrow forwardly with sufficient speed not only to overtake the tractor but also to have sufficient momentum to carry the harrow forwardly until the plates 21 at the front end of the drawbar section 18 engage the rear edges of the slide plates 31 and 32. Then the operator releases his pull on the cable 51 and permits the dog 44 to engage one of the notches 17. In this position the spring 63 is not stretched or biased, and hence the latter portion of the forward movement of the harrow into the position shown in Figure 3 is due to the momentum originally imparted to the harrow by the force stored in the spring when it is in its stressed or biased position (Figures 1, 2 and 4). In the transport position with the gangs in their straightened or aligned positions, the resistance to the forward rolling of the harrow is quite small and hence no great amount of momentum is required to carry the harrow forwardly into the position shown in Figure 3 from the position shown in Figure 2. The mobile stop 28 limits the retracting movement of the channel 16, and hence may be set to secure the desired angle setting, without requiring that the slide 30 be reset each time the harrow is angled out of straightened position. After restoring the harrow to the position shown in Figure 3, it may then be placed in working or angled position merely by pulling on the rear latch cable 51a and releasing the rear dog 44a from the notch 17 of the drawbar section 16, whereupon the inner ends of the gangs will swing back to the position shown in Figure 1, as described above, again placing the spring 63 in its stretched position.

The present invention also contemplates the provision of another form of power means, also deriving power from the tractor, for cocking the slidable drawbar section and, in addition, also available to actually force the harrow into a straightened position, rather than requiring that the harrow be straightened by draft before cocking the slidable drawbar section, preparatory to subsequently angling the harrow by draft. In this form of the invention a hydraulic ram unit, including a cylinder and piston or plunger which replaces the spring 63, is connected with a suitable source of fluid pressure on the tractor, such as an oil pump or the like, and is connected between the two relatively slidable parts of a drawbar construction which is substantially identical with the drawbar construction 15 described above, except that the spring 63 and associated parts are omitted. Therefore, the drawbar parts that are identical with those described above will for the sake of brevity be indicated by the same reference numerals employed above.

The rear, or relatively stationary part 18 of the drawbar 15 is, in the construction shown in Figure 5, arranged substantially as described above, except that, if necessary, the angles 19 may be extended rearwardly, as at 19a, to provide proper clearance for the power angling unit. The power angling unit 99 includes a hydraulic cylinder 100 having a pair of ears 101 which are secured, as by screws 102, to the plate 21. The rear end of the cylinder 100 is open and slidably receives a piston 105, the forward end of which is provided with suitable sealing means 106, such as a leather cup fastened to the piston 105 in the usual way. The unit 99 therefore constitutes a single action ram unit. The rear end of the piston 105 is recessed, as at 107, and pivotally receives the forward end of a piston rod 108, the latter being swingably mounted for limited movement on a pivot pin 109 carried by the rear end of the piston 105. The piston rod 108 extends rearwardly and is provided with a reduced end 113 which seats in the upturned end 110 of a bracket 111 that is slidable on a cross plate 112 fixed to the angles 19 in any suitable way, as by welding or the like. The forward end of the bracket 111 is fastened to the rear end of the slidable drawbar 16 in any suitable manner, as by being secured between the plates 26 and 27a by the bolt 28a (Figure 5), or any other suitable means as desired. A nut 114 fixes the rear end of the piston rod 108 to the bracket 111.

Whenever fluid under pressure is introduced into the cylinder 100, the pressure against the inner end of the piston 105 causes the piston 105 and piston rod 108 to be forced rearwardly into the position shown in Figure 5, thereby shifting the drawbar channel 16 into its rearmost or retracted position. If at this time the yoke 30 is latched to the forward portion of the drawbar channel 16 (as shown in Figure 5), then the pressure against the piston 105 will be effective to force the gangs into their straightened position, by virtue of the fact that the yoke 30 is moved rearwardly and hence can exert a rearward pressure through the draft links 34 against the outer ends of the gangs.

It will be remembered that the yoke 30 may be in its full angled position, in which case the cylinder and piston will be fully extended by the time the gangs are forced into their straightened position and the rear edges of the yoke plates 31 and 32 engage the forward edges of the drawbar plates 21. However, to effectively use this form of power angling apparatus, provision must be made to accommodate forcing the gangs into their straightened position even though the yoke 30 should not be in its forwardmost position along the drawbar channel 16, as when the latch 40 is engaged with one of the intermediate slots 17 for the purpose of holding the gangs in their working position but not angled to the maximum extent. To this end, I have designed the hydraulic power unit 99 for use with a source of pressure on the tractor controlled by a self-releasing valve mechanism, whereby when the yoke 30 has been moved up against the forward end of the rear drawbar section 18, the pressure valve mechanism is tripped so that no more pressure is delivered to the cylinder 100 and in which, however, the fluid is locked in the cylinder, thereby retaining the pressure in the cylinder, so that the inner ends of the front gangs 2 will not drop back when the tractor is driven forwardly.

Figure 7:
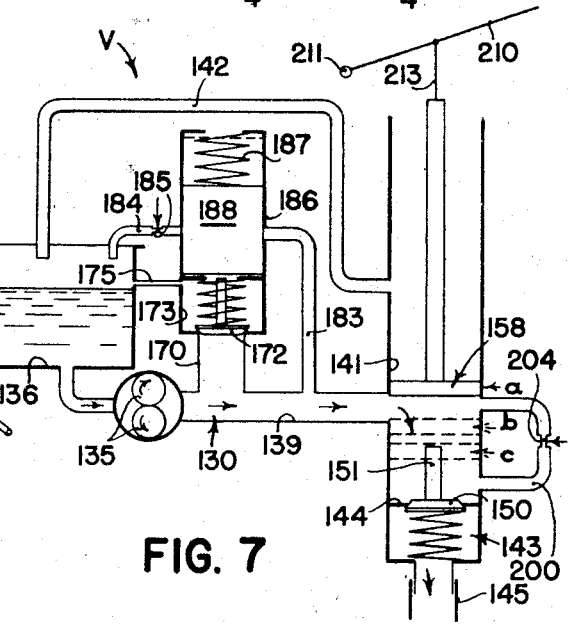
Figure 7 is a schematic view of one form of controlling valve mechanism with which the hydraulic unit of Figure 5 is adapted to operate.

Any suitable form of self-releasing valve mechanism may be employed with the hydraulic unit 99, the principal essential being that the valve mechanism will release when the gangs are moved into their straightened position, irrespective of whether this requires a full stroke of the piston 105 or only a partial stroke. In Figures 6 and 7 I have shown, somewhat schematically, a self-releasing valve mechanism that is suitable, but this invention is not concerned with the particular details per se of the valve mechanism except in so far as they cooperate with my gang controlling and angling means.

Referring now more particularly to Figure 6, it will be seen that the tractor T to which the harrow H is hitched is of more or less conventional construction, embodying a frame 125, front wheels (not shown), and rear wheels 126. The self-releasing valve mechanism is indicated in its entirety by the reference character V and includes a valve body or valve casing 130 having an extension 131 which is adapted to be bolted to the housing of the governor G and which is adapted to enclose a pair of pump gears 135 driven in any suitable manner from the governor shaft. Figure 7 shows the details of the valve mechanism schematically, and from this figure it will be seen that the casing 130 forms or is provided with a chamber 136 which serves as a sump from which oil or other fluid passes to the pump gears 135. The latter deliver oil under pressure into a high pressure duct 139 which extends to and intersects a vertical bore or valve chamber 141. The upper portion of this valve chamber or bore 141 communicates with the sump 136 by a passage 142. At its lower end the bore 141 opens into a check valve chamber 143, there being a check valve seat 144 at this point. The lower end of the check valve chamber 143 receives a connector 145 (Figure 6) to which one end of a flexible tube 146 is connected in any suitable manner. The flexible tube 146 is extended to the power unit 99 and is fixed to a connector 147 threaded into the forward end of the cylinder 100.

The check valve in the chamber 143 is indicated by the reference numeral 150 and is of the poppet type. The valve 150 is adapted to close upwardly against the valve seat 144 for closing off communication between the power unit 99 and the passages 139 and 141. The valve 150 is provided with an upper stem 151 which is adapted to be engaged by the lower end of a manually controlled valve, indicated in its entirety by the reference numeral 158, which is slidable in the bore or passage 141. The lower or inner end of the manually controlled valve 158 is arranged to abut the upper or inner end of the stem 151, but the valve 158 may, of course, move upwardly relative to the check valve 150 and the latter may move downwardly relative to the manually controlled valve 158, there being three possible positions of the valve 158, as indicated in Figure 7 at a, b and c.

When the valve 158 is in the position shown at a fluid delivered by the pump 135 passes through the passage 139 and into the lower portion of the valve chamber 141. The fluid is prevented from passing upwardly past the valve 158 and therefore passes downwardly, opening the check valve 150 and passing to the cylinder 100, thereby extending the piston rod 108 and straightening the gangs, provided of course that the yoke 30 (Figure 1) is attached to the drawbar slide 16. The check valve 144 prevents the return of fluid from the cylinder 100, and hence hydraulically locks the drawbar slide 16 in its rear position. Thus, in the position a of the valve 148, the full pressure of the pump 135 is effective to force the piston 105 rearwardly and to swing the gangs into their straightened position. When the valve 158 is moved down to the position b, shown in dotted lines in Figure 7, it will be seen that fluid from the pump passes from the high pressure duct 139 into the chamber 141 and thence out of the latter through the passage 142 and back to the sump 136.

When the yoke 30 engages the front end of the channel section 18, the piston 105 is prevented from being extended any farther, and therefore pressure builds up in the system, including the high pressure duct 139, the lower end of the passage or valve chamber 141 and the flexible tube 146. Due to the fact that the yoke 30 may be in any one of several positions of adjustment along the drawbar channel 16, to the rear end of which the piston 105 is connected, it will be seen that the piston may reach the end of its permissive movement at any one of several points within the cylinder 100 and that, regardless as to which point may be reached when the yoke comes up against the front end of the drawbar section 18, it is desirable to lock the fluid in the cylinder 100 in order to hold the cylinder in its extended position, whether that is only a partially extended or a fully extended position, depending upon the position of the yoke 30 along the drawbar channel 16, and in addition to locking the fluid in the cylinder 100, which is done by the check valve 150, it is also desirable to automatically release the fluid pressure whenever the piston is prevented from extending any further. It is for this reason that the hydraulic unit 99 cooperates in a novel manner with valve mechanism of the type which automatically releases itself upon the occurrence of excessive pressure within the high pressure side of the system.

The valve mechanism V shown in Figure 7 is of this type and represents any suitable valve mechanism of this character. Referring now more particularly to Figure 7, a bore or passage 170 communicates with the high pressure passage 139, the bore or passage 170 communicating with a relief valve chamber 173 in which a spring biased poppet release valve 172 is disposed. At its upper end the relief valve chamber 173 communicates with a bore or chamber 186 in which a by-pass controlling plunger 188 is slidably disposed in substantially leak-tight relation. At one side, the chamber 186 communicates with the high pressure duct 139 through a passage or duct 183, and at the other side the chamber 186 communicates with the sump 136 through a passage 184, of slightly smaller diameter than the passage 183. Whenever the piston 105 is prevented from extending any further and the pressure builds up in the high pressure side of the system, as mentioned above, this pressure will open the spring biased relief valve 172. This pressure, acting upon the lower end of the plunger 188, forces the latter upwardly until communication is established between the by-pass ducts 183 and 184. As soon as communication is established between the two passageways 183 and 184, the fluid from the pump 135 flows through the by-pass 183, 184 and back to the sump under low pressure, whereupon the relief valve 172 reseats, but due to the fact that the passage 184 is smaller than the passage 183, there is sufficient pressure on the lower end of the plunger 188 to hold the same up in its dotted line position so long as the pump is running. Thus, whenever the piston of the hydraulic unit 99 can move outwardly no farther, the plunger 188 and associated parts serve as self-releasing means to relieve the pump of operating pressure, permitting it to idle while, at the same time, hydraulically locking the fluid in the cylinder 100. If desired, there may be an adjustable restriction 185 in the passage 184. As long as the valve 158 remains in position a, the pump discharges idly through 183, 184, the restriction 184, 185 creating enough pressure to hold the plunger 188 up against a light spring 187. When the valve 158 is moved to its neutral position b, a free passage is opened from the pump to the sump through the passages 141 and 142, and the spring 187 and/or gravity then returns the plunger 188 to its lower position, closing the by-pass 183, 184, fluid below the plunger escaping to the sump through a leak passage 175.

When it is desired to release the fluid in the cylinder 100 and permit it to flow back to the sump 136, as is necessary when it is desired to permit the inner ends of the gangs to drop back during forward travel of the outfit, the controlling valve 158 is moved downwardly into its position c, which opens the check valve 150. In this position, fluid from the cylinder 100 flows through a by-pass duct 200 past an adjustable restriction 204 and around the valve 158 into the upper portion of the chamber or bore 141 and from there the fluid from the cylinder 100 passes back to the sump 136 under the control of the adjustment 204. Preferably, the restriction 204 is fairly free, and it may be eliminated entirely, since a quick shift of the gangs into their angled position is usually desired.

Any suitable means may be provided for controlling the valve 158. Preferably, however, the valve 158 is shifted into and out of its several positions, by means of a hand lever indicated by the reference numeral 210 in Figures 6 and 7. The lever 210 is pivotally mounted on a bracket 211 fixed to a portion of the valve casing 130 (Figure 6) and includes an arm connected by a link 213 to the upper stem of the valve 158.

In operation, when it is desired to straighten the gangs from an angled position, the operator raises the valve handle 210, which causes fluid to flow under pressure to the cylinder 100. This retracts the front drawbar section relative to the rear drawbar section and thus pulls up on the inner ends of the gangs. To angle the gangs from a straightened position, or to increase the angle when they are in an intermediate angled position, the operator momentarily depresses the hand lever 210 of the valve mechanism V, which permits the oil to flow out of the cylinder 100 and hence permits the inner ends of the front gangs to drop back, due to the pressure of the soil against the inner ends of the straightened gangs, this pressure at the same time also serving to force the oil back to the sump.

With the disk harrow arrangement shown in Figures 1 to 3, if the conditions should be such that the tractor would tend to mire down with the gangs in angled position, by leaving the front latch engaged and releasing the rear latch 40a, the tractor may be backed to force the gangs into their straightened position. Likewise, in Figures 5 and 6 the tractor may be backed to straighten the gangs, in which case it would be preferable to force oil back into the cylinder 100, not only to aid in straightening the gangs under these conditions but also to hold the gangs in their straightened position.

It will be seen from the foregoing description that I have provided power-actuated means, energized by the power of the tractor, for restoring the drawbar to its retracted position so that the gangs may be angled at any time by the pull of the forward draft without requiring that the tractor or other propelling force be backed. The power means which I have provided to this end may take two forms, one being spring means which is so constructed and arranged that power may be stored and made available at any time for retracting the slidable drawbar member. The second form incorporates a hydraulic cylinder and piston or ram unit, including a source of pressure actuated by the tractor, arranged to shift the gangs into their straightened position by power. The hydraulic ram units, 99 or 99a, may be considered either as a part of the disk harrow or as a part of the tractor. If the former, the implement may be readily disconnected from the tractor by releasing the clevis 49 and disconnecting the tube 146 at any suitable point, as at one or the other of the connections 145 or 147, or at some point particularly designed to provide a ready disconnection. If the hydraulic unit is a part of the tractor, it may be readily disconnected from the implement by removing the nut 114 and the screws 102. If desired, any suitable form of quick disconnecting means may be used for attaching the unit to the implement. Preferably, however, the unit is the part of the implement, since its range of action and capacity, as shown and described above, has been designed to angle or straighten the harrow in a short period of time without excessive power requirements, and as explained above, controlling valve mechanism of the self-releasing type is an important part of the mechanism shown in Figures 5 to 7 for controlling the disk harrow.

While I have shown and described above the preferred means in which the principles of the present invention have been embodied, it is to be understood that my invention is not to be limited to the particular details shown and described above, but that, in fact, widely different means may be employed in the practice of the broader aspects of my invention.

What I claim, therefore, and desire to secure by Letters Patent is:

1. A disk harrow comprising a disk gang, frame means therefor, a drawbar slidable on said frame means, means detachably connecting the drawbar with said gang for shifting the latter by movement of said drawbar, and power means connected with said drawbar for shifting the disk gang through movement of the drawbar when the gang is connected to said drawbar and shifting the latter independently of the gang when the gang is disconnected from the drawbar.

2. A disk harrow comprising a disk gang, means with which said gang is shiftably connected, a drawbar shiftable with respect to said means and adapted to be connected with the gang whereby draft force applied to the drawbar is adapted to shift said gang, and spring means connected with said drawbar and said gang for shifting the drawbar when the harrow is in transport position.

3. A disk harrow comprising means serving as a frame, a pair of gangs movably connected therewith for generally horizontal swinging movement, a drawbar slidable relative to said frame means, draft links pivotally connected with said gangs, latch means optionally connecting said draft links with said slidable drawbar, and means connected between said frame means and the slidable drawbar for shifting the latter relative to the frame means.

4. A tractor disk harrow comprising means serving as a frame, a pair of gangs movably connected therewith for generally horizontal swinging movement, a drawbar slidable relative to said frame means, draft links pivotally connected with said gangs, latch means optionally connecting said draft links with said slidable drawbar, fluid actuating means connected between said frame means and the slidable drawbar for shifting the latter relative to the frame means, and a source of fluid means under pressure on the tractor controllably connected with said fluid actuated means.

5. A disk harrow as defined in claim 4, further characterized by said means being adapted to exert sufficient power to shift said gangs when said latch means is engaged with said slidable drawbar.

6. A disk harrow as defined in claim 4, further characterized by said slidable drawbar being adapted to be connected to a tractor and said last mentioned means acting against said slidable drawbar for shifting said harrow relative thereto when said latch means releases said links from connection with the slidable drawbar.

7. In a disk harrow, frame means, a pair of disk gangs pivoted at their inner ends to said frame means for generally horizontal swinging movement, a drawbar comprising two relatively slidable members, one connected with said frame means and the other slidably generally fore and aft relative to said one drawbar member, a front slide adapted to be releasably latched to said slidable drawbar member, draft links connecting said front slide with the outer ends of said gangs, and means connected between said frame means and the inner end of said slidable drawbar member and adapted to retract the latter.

8. A disk harrow as defined in claim 7, further characterized by said retracting means comprising a spring.

9. A disk harrow as defined in claim 7, further characterized by said slidable drawbar member being adapted to be attached to a tractor and said retracting means comprising a hydraulic power unit deriving power from said tractor.

10. In a disk harrow, a pair of gangs, a drawbar construction comprising two telescopically associated members, means connecting one of said members to the inner ends of said gangs, hitch means for transmitting draft to the other of said members and through said one member to the inner ends of said gangs, means connected between said other member and the outer ends of said gangs, and means connected with said members for shifting them into telescoped relation.

11. In a tractor-propelled disk harrow, a drawbar construction comprising a first member, a second member slidable with respect to the forward portion of said first member, means deriving operating energy from said tractor and connected between said first member and the rear end of said second member for moving the latter relative to said first member, a pair of gangs pivotally connected at their inner ends with the rear end of said first member, a slide on the forward portion of said second member and connected with the outer ends of said gangs, and means limiting the movement of said slide relative to said second member.

12. In a disk harrow, a drawbar construction comprising a first member adapted to be connected with the disk harrow, a second member slidable within said first member, and a spring connected at one end to the disk harrow end of said first member and to the other member adjacent the opposite end thereof.

13. In a disk harrow, a drawbar construction comprising a first member connected at one end with said harrow, a second member slidable within the other end of said first member and having at its other end draft receiving means, spring means connected at one end to said one end of the first drawbar member and at its other end with the draft receiving end of said second drawbar member, draft applied to the latter serving to extend said drawbar members and tension said spring, and releasable latch means for holding said drawbar members in extended position.

14. A disk harrow comprising frame means, a pair of disk gangs pivotally connected at their inner ends with said frame means for generally horizontal swinging movement, a drawbar construction comprising a rear member connected at its rear end with said frame means and a slidable draft receiving member telescopically associated with and extending forwardly of said rear member, draft connections adapted to be releasably latched with said forwardly extending draft member and connected with the outer ends of said gangs, whereby when said draft receiving member is in retracted position relative to said rear draft member and said draft connections are latched to said draft receiving member, draft applied to the latter with said connections latched thereto will act through the latter to angle said gangs to an extent depending upon the position said draft connections are latched to said draft receiving member, means acting between the rear member and the slidable draft receiving member of said drawbar construction for retracting said draft receiving member rearwardly relative to said rear draft member, and stop means carried by said draft receiving member and engageable with said draft connections for limiting the amount said draft receiving member may be retracted by said retracting means, said stop means serving to determine an angled position for said gangs when draft applied to said draft receiving member acts through said draft connections for pulling the outer ends of said gangs forwardly.

15. A disk harrow comprising frame means, a pair of disk gangs pivoted at their inner ends to said frame means and swingable generally horizontally, a sliding drawbar movable generally longitudinally relative to said frame means, a slide embracing said slidable drawbar and link-connected to the outer ends of said gangs, latch means carried by said slide for controlled engagement with said sliding drawbar, forward movement of said sliding drawbar from its retracted position relative to said frame means when said slide is latched to the outer portion of said sliding drawbar serving to angle said gangs and releasing said latch means permitting said slide to move rearwardly along the sliding drawbar and the gangs to move into their straightened position, retracting means on the harrow for moving said drawbar rearwardly relative to said frame means and adjustable stop means carried at the forward portion of said sliding drawbar and serving to limit the rearward movement thereof by said retracting means when said latch means is released.

16. A disk harrow comprising frame means, a pair of disk gangs pivoted at their inner ends to said frame means for generally horizontal swinging, a drawbar slidably disposed relative to said frame means and adapted to receive draft from a propelling means, connections between the outer ends of said gangs and said slidable drawbar, said connections being adapted to be latched to said slidable drawbar when the latter is in its retracted position relative to said frame means, whereby the application of draft to said drawbar serves to extend the latter and at the same time angles said gangs through said draft connections, said draft connections being releasable from said drawbar so that the soil resistance acts to swing said gangs into their straightened position and to move said draft connections rearwardly along said drawbar, and ratchet latch means for connecting said draft connections with said drawbar to provide for shifting the same into its retracted position without releasing the latch means, whereby a subsequent forward movement of said drawbar relative to said frame means acts through said draft connections to angle said gangs.

17. A disk harrow comprising frame means, a pair of disk gangs pivoted at their inner ends to said frame means for generally horizontal swinging, a drawbar slidably disposed relative to said frame means and adapted to receive draft from a propelling means, connections between the outer ends of said gangs and said slidable drawbar, said connections being adapted to be latched to said slidable drawbar when the latter is in its retracted position relative to said frame means, whereby the application of draft to said drawbar serves to extend the latter and at the same time angles said gangs through said draft connections, said draft connections being releasable from said drawbar so that the soil resistance acts to swing said gangs into their straightened position and to move said draft connections rearwardly along said drawbar, ratchet latch means for connecting said draft connections with said drawbar to provide for shifting the same into its retracted position without releasing the latch means, whereby a subsequent forward movement of said drawbar relative to said frame means acts through said draft connections to angle said gangs, and means acting between said frame means and said drawbar for shifting the latter into its retracted position.

18. A disk harrow comprising frame means, a pair of disk gangs pivoted at their inner ends to said frame means for generally horizontal swinging, a drawbar slidably disposed relative to said frame means and adapted to receive draft from a propelling means, connections between the outer ends of said gangs and said slidable drawbar, said connections being adapted to be latched to said slidable drawbar when the latter is in its retracted position relative to said frame means, whereby the application of draft to said drawbar serves to extend the latter and at the same time angles said gangs through said draft connections, said draft connections being releasable from said drawbar so that the soil resistance acts to swing said gangs into their straightened position and to move said draft connections rearwardly along said drawbar, and a hydraulic power driven cylinder and piston unit connected at one end with said frame means and at the other end with said drawbar for moving the latter into its retracted position.

19. A disk harrow comprising frame means, a harrow gang shiftable relative thereto, a drawbar slidable relative to said frame means, means acting between said frame means and said drawbar for shifting one relative to the other, and means connected between said slidable drawbar and the gangs for shifting the latter by virtue of movement of the drawbar relative to said frame means.

20. An agricultural implement adapted to be propelled by a tractor and comprising a disk harrow including means serving as a frame, a pair of disk gangs having their inner ends connected with said frame means, a draft receiving member adapted to be moved relative to said frame means, said draft receiving member being adapted to be connected to said tractor, optionally releasable connections between said member and the outer ends of said gangs whereby, when said member is in one position relative to said frame means, draft force applied to said member may be utilized for angling said gangs, and means on the harrow deriving power from the tractor for moving said draft receiving member into said position.

21. A disk harrow comprising frame means, a draft receiving member movable relative to said frame means, a pair of gangs, optionally actuatable connections between said draft receiving member and outer ends of said gangs whereby when said draft receiving member is in one position relative to said frame means, a forward pull on said draft member acts to angle said gangs, and means acting between said frame means and said draft receiving member for moving the latter into said one position.

22. In a harrow, the combination of a harrow device, means providing for movement thereof to different operating positions, adjustable means for limiting the movement of the harrow device in one direction so as to provide for setting the harrow device into any one of said operating positions, and power means separate from said limiting means for moving said harrow device toward its non-operating position irrespective of the particular position in which the harrow device has been operating.

23. In a harrow, the combination of a harrow device, means providing for movement thereof to different operating positions, means for setting the harrow device into any one of its several operating positions, and power means acting through said setting means for moving the gangs from any working position into their transport position, said power means including pressure responsive self-releasing mechanism adapted to be released when the gangs reach their transport position.

24. A tractor disk harrow comprising a draft frame, a pair of gangs swingable generally horizontally relative thereto from an angled position into a straightened transport position, the pressure of the soil tending to swing said gangs beyond their transport position, means to adjust the degree of angle of the gangs in the working position thereof, means to prevent the gangs from moving out of a working position beyond their transport position, and hydraulic power means energized by the power of the tractor for shifting the gangs to a transport position from any angled working position, said hydraulic power means having a range of movement sufficient to move the gangs from their extreme angled position to their transport position and arranged to be disabled when said gangs are moved to their transport position from any intermediate angled position.

25. In a harrow, the combination of a harrow device movable different distances into and out of any one of a series of angled operating positions, pressure actuated means adapted and having the capacity to shift said device through the maximum distance required to move the same from one position to another, means for terminating the movement of said device at one of said positions irrespective of the distance through which the device was shifted in reaching said position, and self-releasing valve mechanism controlling the application of pressure to said pressure actuated means and responsive to an increase in the pressure in the latter, resulting from termination of movement by said terminating means, for diverting pressure from said pressure actuated means.

26. A disk harrow adapted to be propelled by a tractor, comprising the combination of one or more swingable disk gangs, a drawbar having stop means adjacent each end thereof, one of said stop means determining the straightened transport position of the gangs and the other of said stop means being adjustable relative to the first stop means and operable to determine the angled position of the gangs, and self-releasing gang shifting mechanism adapted to derive power from the tractor and operative through a given range of movement sufficient to shift the gangs the maximum distance from one stop means to the other, said shifting mechanism automatically releasing when the gangs are moved against one of said stop means through a distance less than said given range of maximum movement.

27. The combination of a disk harrow having a gang adapted to be swung into and out of angled position, means limiting movement of said gang and adjustable means for determining the degree of angle of said gangs, and fluid pressure actuated means adapted to move said gang various distances between any one of a plurality of angled working positions and a non-working position, a source of fluid under pressure, and controlling valve mechanism connected between said pressure source and said pressure actuated means and including means responsive to a pressure increase in said pressure actuated means for automatically releasing the pressure exerted against said fluid actuated device when said gang reaches one of its end positions as defined by said limiting means.

28. The combination of a disk harrow having a disk gang adapted to be shifted various distances between any one of a series of adjusted positions and a substantially fixed position, two limit means determining the end positions, respectively, of said tool means, pressure actuated means operably connected with said tool means and adapted to shift said tool means through the maximum distance from one position to another, a source of pressure, and self-releasing valve mechanism controlling the application of pressure to said pressure actuated means and responsive to an increase in the pressure in the latter, resulting from termination of movement of said tool means by said limit means, for diverting pressure from said pressure actuated means.

29. The combination of a tractor, a disk harrow having frame means, a disk gang swingably connected therewith for movement between an adjusted angled position and a straightened position, and limit means, including an adjustable part, defining said positions, a single action ram including a plunger and cylinder, one anchored to said frame means and the other connected with said gang to shift the same through various distances into one of said positions, a source of pressure on the tractor, and controlling valve mechanism between said source and said ram and including a main valve, a by-pass around said main valve, a valve controlling said by-pass, and means responsive to the increase of pressure in said cylinder, after said gang is moved into one of its positions and said limit means prevents further movement of said gang and thereby prevents further relative movement between said plunger and cylinder, for opening said by-pass valve.

30. A disk harrow comprising a pair of disk gangs, drawbar means pivotally connected with the inner ends of said gangs, a member movable along said drawbar means and operatively connected with the outer ends of said gangs, and hydraulic means connected between said drawbar means and said member for shifting said gangs.

31. In a disk harrow, frame means, a pair of disk gangs pivoted at their inner ends to said frame means for generally horizontal swinging movement, two relatively slidable members, one connected with said frame means and the other slidable generally fore and aft relative to said one member, draft links connecting said slidable member with the outer ends of said gangs, and a hydraulic unit including a cylinder connected with one of said members and a piston connected with the other member for shifting said slidable member and swinging said gangs about their points of pivot connection with said frame means.

32. In a disk harrow adapted to be propelled by a tractor, frame means, a pair of disk gangs pivoted at their inner ends to said frame means for generally horizontal swinging movement, two relatively slidable members, one connected with said frame means and the other slidable generally fore and aft relative to said one member, draft links for connecting said slidable member with the outer ends of said gangs, means deriving energy from the tractor and connected between and supported on at least one of said members for shifting said slidable member relative to the other member, and means serving as an adjustable stop on said one member and positioned to be engaged by the slidable member for variably limiting the movement of said sliding member relative to said other member by the action of said shifting means.

33. In a disk harrow adapted to be propelled by a tractor, frame means, a pair of disk gangs pivoted at their inner ends to said frame means for generally horizontal swinging movement, two relatively slidable members, one connected with said frame means and the other slidable generally fore and aft relative to said one member, draft links connected with the outer ends of said gangs, releasable means for connecting the draft links with said slidable member, and spring means energized by the power of the tractor and connected between said members for shifting said slidable member relative to the other member when the slidable member is disconnected from said draft links.

34. In a disk harrow adapted to be propelled by a tractor, frame means, a pair of disk gangs pivoted at their inner ends to said frame means for generally horizontal swinging movement between angled and straightened positions, two relatively slidable members, one connected with said frame means and the other slidable generally fore and aft relative to said one member, draft links connecting said slidable member with the outer ends of said gangs, and a hydraulic unit deriving power from the tractor and including a cylinder connected with one of said members and a piston connected with the other member for shifting said slidable member and swinging said gangs about their points of pivot connection with said frame means into their straightened position.

35. A tractor harrow comprising frame means, a disk gang pivoted thereto for horizontal swinging movement, a drawbar slidably mounted on said frame means and adapted to be connected at its forward end with the tractor, a connection between said drawbar and said gang whereby forward movement of the drawbar relative to said frame means by the forward movement of the tractor shifts said gang into one position, and power-actuated means acting between said frame means and said slidable drawbar and reacting through the latter against the tractor for shifting the frame means and gang generally forwardly relative to the drawbar.

36. A disk harrow adapted to be connected with a propelling force and comprising a pair of gangs swingable between angled and straightened positions, two-part drawbar means, one part of which is connected with the inner ends of said gangs and the other part of which is shiftable relative to said one part and is connected with the outer ends of the gangs, said other part being the part that receives the propelling force, and power actuated means for retracting said parts to swing the gang from an angled position into straightened position.

37. A tractor disk harrow comprising frame means, a gang of earth working disks suitably connected at its inner end with said frame means and movable relative thereto into and out of angled and non-working positions, a single acting hydraulic unit deriving operating energy from the tractor and connected with said gang for swinging its outer end rearwardly into one position, valve means for releasing the pressure in said unit to provide for swinging the gang into its other position, and means operative when the pressure in said unit has been released whereby soil resistance against the inner end of said gang swings the latter into said other position.

38. A disk harrow adapted to be propelled by a tractor, comprising frame means, a pair of disk gangs pivotally connected with said frame means for swinging movement between angled and straightened positions, draft receiving means slidably connected with said frame means, means connecting the movable ends of the gangs with said draft receiving means, whereby rearward movement of said slidable draft receiving means relative to the frame means moves the gangs into a straightened position when the draft receiving means is connected with the movable ends of the gangs, said connecting means being releasable, means deriving power from the tractor operatively connected with the frame means and the gangs for moving said gangs toward one position by power, and means whereby forward movement transmitted to the harrow through said draft receiving means will straighten said gangs when the latter are disconnected from the slidable draft receiving means.

39. A disk harrow adapted to be propelled by a tractor, comprising frame means, a pair of disk gangs pivotally connected with said frame means for swinging movement between angled and straightened positions and disposed whereby pressure of the soil against the disks tends to swing the gangs from one position to another, draft receiving means slidably connected with said frame means, and means deriving power from the tractor operatively connected between said slidable means and said frame means so as to react against said slidable means for moving said gangs into said one position, said power means including a hydraulic ram unit and means for hydraulically locking the ram unit in extended position when said gangs are moved into said one position, so as to prevent movement of said gangs out of said position.

40. A disk harrow adapted to be propelled by a tractor, comprising frame means, a pair of disk gangs pivotally connected with said frame means for swinging movement between angled and straightened positions, draft receiving means movably connected with said frame means, a part movable relative to said movable draft receiving means and connected with said gangs, means deriving power from the tractor operatively connected between said part and said frame means so as to react against said part for moving said gangs into one position, and means for operatively connecting said part with said movable draft receiving means whereby movement of the latter swings said gangs.

41. A disk harrow comprising a pair of disk gangs, a drawbar construction comprising a pair of slidably associated members, means connecting one of said members with the inner ends of said gangs, a part slidable on the other of said members, means connecting said part with the outer ends of said gangs, and means providing a one-way connection between said part and said other member, whereby movement of said other member in one direction moves said part and the outer ends of said gangs, said other member being movable freely relative to said part without moving the outer ends of said gangs.

42. A disk harrow comprising a disk gang, a drawbar construction comprising a pair of slidably associated members, means connecting one of said members with one end of said gang, a part slidably associated with the other of said members, means connecting said part with the other end of said gang, and one-way connection means connecting said part with said other member, whereby movement of the latter relative to said one member in one direction serves to shift the position of said gang but movement of said other member in the other direction does not shift said gang.

43. A disk harrow comprising frame means, a pair of disk gangs pivoted at their inner ends to said frame means for generally horizontal swinging, a drawbar slidably disposed relative to said frame means and adapted to receive draft from a propelling means, one-way ratchet latch means connecting the outer ends of said gangs with said slidable drawbar, said one-way latch means being adapted to be latched to said slidable drawbar when the latter is in its retracted position relative to said frame means, whereby the application of draft to said drawbar serves to extend the latter and at the same time angle said gangs through said one-way latch means, the latter providing for shifting the drawbar into its retracted position without releasing the one-way latch means, and means for retracting said drawbar.

44. A disk harrow comprising frame means, a disk gang movably connected therewith, a drawbar movable relative to said frame means, a slide disposed on said drawbar and connected with said gang, power means anchored to said frame means and operatively connected with said gang through said slide for shifting the gang in one direction by power, and means for causing movement of said drawbar relative to said frame means to shift said gang in the other direction.

45. A tractor disk harrow comprising a pair of disk gangs, frame means with which the inner ends of the gangs are connected, a member shiftable with respect to said frame means and adapted to be connected with said tractor to receive draft therefrom, means releasably connecting the outer ends of said gangs with said shiftable member, and power means reacting against said frame means and said shiftable member for forcing said gangs from an angled position into straightened position.

46. A tractor disk harrow comprising a pair of disk gangs, frame means with which the inner ends of the gangs are connected, a member shiftable with respect to said frame means and adapted to be connected with said tractor to receive draft therefrom, means releasably connecting the outer ends of said gangs with said shiftable member, and power means reacting against said frame means and said shiftable member for forcing said gangs from an angled position into straightened position, said gangs also tending to move from their angled position into their straightened position by releasing said releasable connecting means.

47. A tractor disk harrow comprising a pair of disk gangs, frame means with which the inner ends of the gangs are connected, a member shiftable with respect to said frame means and adapted to be connected with said tractor to receive draft therefrom, means releasably connecting the outer ends of said gangs with said shiftable member, and power means reacting against said frame means and said shiftable member for forcing said gangs from an angled position into straightened position, said gangs also being straightened by backing the tractor while said releasable connecting means connects the gangs with the shiftable member.

48. A tractor disk harrow comprising a pair of disk gangs, frame means with which the inner ends of the gangs are connected, a member shiftable with respect to said frame means and adapted to be connected with said tractor to receive draft therefrom, power means acting against said frame means and the outer ends of the gangs for forcing the latter into one position, and means connecting said shiftable member with said gangs whereby backing of the tractor acts through the shiftable member for also forcing the gangs into a straightened position.

49. A tractor disk harrow comprising a pair of disk gangs, frame means with which the inner ends of the gangs are connected, a member shiftable with respect to said frame means and adapted to be connected with the outer ends of the gangs, means for causing the backing of the tractor to shift said shiftable member rearwardly relative to said frame means and thereby force the gangs into straightened position, and power means acting against said frame means for shifting said gangs while the tractor acts through said frame means to propel the harrow forwardly.

50. A tractor disk harrow comprising a pair of disk gangs, frame means with which the inner ends of the gangs are connected, a member shiftable with respect to said frame means and adapted to be connected with the outer ends of the gangs, means for causing the backing of the tractor to shift said shiftable member rearwardly relative to said frame means and thereby force the gangs into straightened position, and power means acting through said shiftable member and said frame means or shifting said gangs while the tractor propels the harrow forwardly.

CHARLES H. WHITE.